(12) United States Patent
Chan et al.

(10) Patent No.: US 8,130,738 B2
(45) Date of Patent: Mar. 6, 2012

(54) MOBILE DEVICE SERVICES ACQUISITION

(75) Inventors: Ming Sum Chan, Hong Kong (CN); Lai Wa Lam, Kowloon (CN)

(73) Assignee: International Business Machines Corporation, Armonk, NY (US)

( * ) Notice: Subject to any disclaimer, the term of this patent is extended or adjusted under 35 U.S.C. 154(b) by 1140 days.

(21) Appl. No.: 11/598,849

(22) Filed: Nov. 14, 2006

(65) Prior Publication Data
US 2007/0123297 A1 May 31, 2007

(30) Foreign Application Priority Data
Nov. 28, 2005 (CN) .......................... 2005 1 0126920

(51) Int. Cl.
*H04W 4/00* (2009.01)

(52) U.S. Cl. .................. 370/341; 455/41.2; 455/414.1; 455/509; 370/338

(58) Field of Classification Search .................. 370/341
See application file for complete search history.

(56) References Cited

U.S. PATENT DOCUMENTS

| | | | |
|---|---|---|---|
| 5,526,400 | A | 6/1996 | Nguyen |
| 5,594,739 | A | 1/1997 | Lemieux |
| 6,131,024 | A * | 10/2000 | Boltz ............................ 455/405 |
| 6,493,556 | B1 | 12/2002 | Stinson |
| 6,751,478 | B1 | 6/2004 | Sakai et al. |
| 6,785,544 | B2 | 8/2004 | Kim et al. |
| 2001/0009855 | A1 | 7/2001 | l'Anson |
| 2002/0187750 | A1 * | 12/2002 | Majumdar ...................... 455/41 |
| 2004/0203580 | A1 | 10/2004 | Engelhart |
| 2004/0203800 | A1 | 10/2004 | Myhre et al. |
| 2005/0003822 | A1 | 1/2005 | Aholainen et al. |
| 2005/0064866 | A1 | 3/2005 | Sun et al. |
| 2005/0066033 | A1 * | 3/2005 | Cheston et al. ............... 709/225 |
| 2005/0101323 | A1 | 5/2005 | Beer |
| 2005/0130653 | A1 | 6/2005 | Bisdikian et al. |
| 2005/0173509 | A1 * | 8/2005 | Miettinen ...................... 235/375 |
| 2005/0208892 | A1 * | 9/2005 | Kotola et al. ................. 455/41.2 |
| 2005/0255839 | A1 * | 11/2005 | Perttila ......................... 455/419 |
| 2006/0094405 | A1 * | 5/2006 | Dupont ....................... 455/414.1 |
| 2006/0199533 | A1 * | 9/2006 | Zilliacus et al. ............. 455/41.2 |
| 2006/0212511 | A1 * | 9/2006 | Garcia-Martin .............. 709/203 |

(Continued)

FOREIGN PATENT DOCUMENTS
JP     2002325151 A1    11/2002

(Continued)

OTHER PUBLICATIONS

Chinese Office Action Issued Dec. 18, 2009 in connection with Application Serial No. 200510126920.9, filed Nov. 28, 2005.

*Primary Examiner* — Charles Appiah
*Assistant Examiner* — Mazda Sabouri
(74) *Attorney, Agent, or Firm* — Patrick J. Daugherty; Driggs, Hogg, Daugherty & Del Zoppo Co., LPA

(57) ABSTRACT

Provided is a method for enabling a mobile device to subscribe and acquire services, including the steps of: detecting available services/connections or service/location tags which are selectable by the mobile device within the short-to-medium range from the mobile device; triggering the mobile device to connect to a corresponding service/connection provider and/or to issue related commands thereto based on the detected result; performing other actions required to be triggered to acquire services in the mobile device, so as to acquire services from the service/connection providers. The present invention also discloses an apparatus for enabling a mobile service to subscribe to and acquire services, and a mobile device capable of subscribing and acquiring services.

17 Claims, 3 Drawing Sheets

U.S. PATENT DOCUMENTS

| | | | |
|---|---|---|---|
| 2006/0220838 A1* | 10/2006 | Wakim et al. | 340/539.12 |
| 2006/0293085 A1 | 12/2006 | Lauper | |
| 2007/0005363 A1* | 1/2007 | Cucerzan et al. | 704/256 |
| 2007/0245125 A1* | 10/2007 | Telesco | 712/29 |

FOREIGN PATENT DOCUMENTS

| | | |
|---|---|---|
| JP | 2005286585 A1 | 10/2005 |
| JP | 2005303668 A1 | 10/2005 |
| WO | 2005086025 A1 | 9/2005 |

* cited by examiner

MOBILE DEVICE SERVICES ACQUISITION

FIELD OF THE INVENTION

This invention is generally related to the field of short-to-medium range communication, and is particularly related to an apparatus and method for enabling a mobile device to subscribe and acquire services based on the location within the short-to-medium range, and such a mobile device.

BACKGROUND OF THE INVENTION

In recent years, with the development of computer, network and communication techniques, wireless communication is playing a more and more important role in the daily life of the people, and short-to-medium range wireless communication techniques are increasingly becoming the focus of the people's interest. Frequently used short range wireless communication techniques include Bluetooth Technique, IEEE 802.11 (Wi-Fi), ZigBee, Ultra WideBand, Near Field Communication (NFC) and the like.

In the existing wireless communication techniques, providing the location based services for mobile devices using short range communication capability has not been leveraged fully. In general, in order for a mobile device to use a specific service from a service access point, a user of a mobile device often needs to issue commands to the service access point through a manual input device to trigger a request for services, e.g., forwarding a mobile phone call to a desk phone, selecting a specific Wi-Fi Network Provider based on connection cost and so on. These operations are often routine and repetitive in nature, and thus it is waste of time and effort for the user. In addition, because the user may not be aware of whether or not there are other available services selectable by the mobile device within the short-to-medium range from the mobile device, there is no comparability therein, and the user cannot seek a cheaper or desirable way to select the service access point. Such a mobile device may be, for example, a mobile phone, PDA, notebook and the like. The service access point may be, for example, a Desk Phone, Wireless Access Point, Desktop Computer and the like.

SUMMARY OF THE INVENTION

An object of the present invention is to provide a method and apparatus for enabling a mobile device to subscribe to and acquire services.

Another object of the present invention is to provide a mobile device in which services can be subscribed to and acquired automatically.

In order to achieve the objects described above, according to one aspect of the present invention, there is provided a method for enabling a mobile device to subscribe to and acquire services, comprising the steps of: detecting available services/connections or service/location tags which are selectable by the mobile device within a short-to-medium range from the mobile device; triggering the mobile device to connect to a corresponding service/connection provider and/or to issue related commands thereto based on the detected result; and performing other actions required to be triggered to acquire services in the mobile device, so as to acquire services from the service/connection provider.

According to another aspect of the present invention, there is provided an apparatus for enabling a mobile device to subscribe to and acquire services automatically, comprising: a short range sensing module for detecting available services/connections or service/location tags which are selectable by the mobile device within the short-to-medium range from the mobile device; a trigger module for triggering the mobile device to connect to a corresponding service/connection provider and/or to issue related commands thereto based on the detected result of the short range sensing module; and a service acquiring module for performing other actions required to be triggered to acquire services, so as to acquire services from the service/connection provider.

According to still another aspect of the present invention, there is provided a mobile device capable of subscribing and acquiring services, the mobile device including the above apparatus for enabling the mobile device to subscribe to and acquire services automatically.

By providing the function of automatic service subscription, the mobile device can interact with the external environment dynamically, so as to allow users to enjoy location based services quickly and cheaply.

According to the present invention, the mobile device or connection service provider can automatically perform some actions, such as synchronization, etc., to fulfill information update.

By switching service/connection automatically, network coverage of the mobile device can be increased, and by providing automatic service selection/roaming, the usability of the mobile device can also be improved.

The above and other features of the present invention will become more apparent from the following detailed description of the preferred embodiments of the present invention taken in conjunction with the appended drawings.

BRIEF DESCRIPTION OF THE DRAWINGS

The same or similar reference numerals are used to denote the same or similar components throughout the drawings, in which.

DESCRIPTION OF THE PREFERRED EMBODIMENTS

For the purpose of understanding, before describing in detail the embodiments of the present invention in conjunction with the appended drawings, the meanings of several terms used in this specification are briefly described at first.

A location tag is an identifier of a location which is recognized by the mobile device (through the unique ID of the tag, or other serial number unique to the mobile device).

The location tag may be a Bluetooth tag or other form of RF (Radio Frequency) device (for example, a RFID (Radio Frequency Identification) tag), which has a unique ID which can be registered by a user in his/her device and used to identify a location. For example, Kitchen Tag Bluetooth can inform the mobile device that it is within a certain distance from the kitchen.

The location tag can be used to identify which one of the plurality of services is connected preferably by the mobile device and which one of a series of actions are executed preferably. For example, when a mobile phone has detected a location tag with an identifier of "HOME: 8793135373", it will forward all mobile calls to the home fix phone line. The location tag usually does not provide services directly.

Optionally, the location tag may contain a memory which stores the identifier thereof and other necessary information.

A service tag is similar to the location tag, but it identifies a service itself and provides identification to a service. The service tag can be implemented as logic implemented in a service provider device which provides service details to the mobile device. Alternately, the service tag can also be a hardware tag which can attach externally to a service provider. (This is because, for most legacy devices, they do not support service subscription.)

The following will describe embodiments of the present invention in detail in conjunction with the appended drawings.

Figure 1:
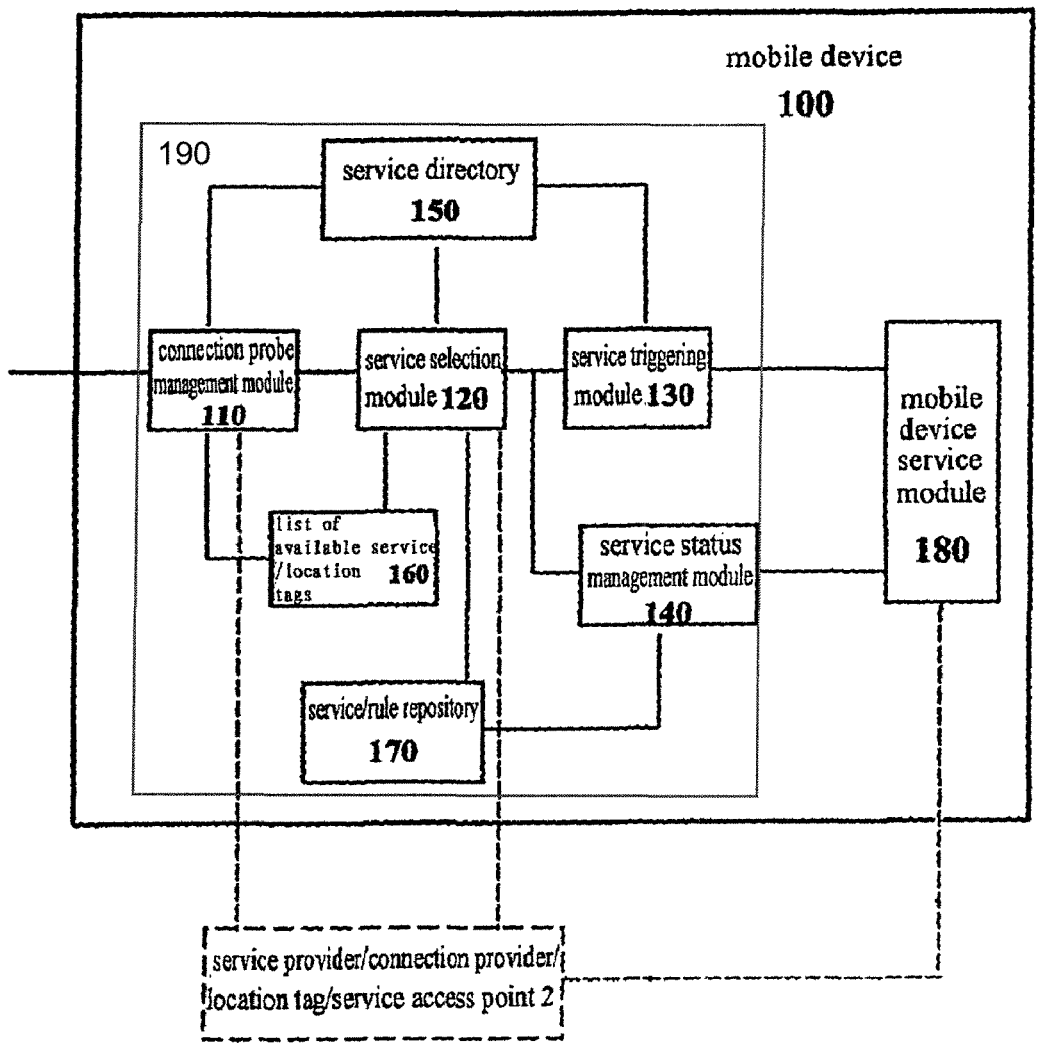
FIG. 1 shows a block diagram of a mobile device according to an embodiment of the present invention.

FIG. 1 shows a block diagram of a mobile device 100 according to an embodiment of the present invention.

It should be noted that, for the sake of simplicity and clarity, as shown in FIG. 1, only modules related to the present invention are shown in the mobile device 100, and as for other existing modules not much related to the present invention, in FIG. 1, one module, i.e., a mobile device service module 180 is used as a whole to denote them, in order not to obscure the present invention with unnecessary details. Herein, the mobile device service module 180 represents the whole one of all other modules and means required for performing normal functions of the mobile device.

As shown in FIG. 1, the mobile device 100 mainly comprises a connection probe management module 110, a service selection module 120, a service triggering module 130, a service status management module 140, a service directory 150, a list 160 of available service/location tags which are selectable by the mobile device, and a service/rule repository 170, all of which may be formed on an I/C chip as schematically shown at 190, or on separate I/C chips.

The connection probe management module 110 can support a plurality of communication protocols (in addition to the several frequently used wireless communication protocols mentioned above, other wireless and wired communication protocols can also be included), and deal with the hand shaking with different devices according to different protocols in order to determine whether or not the available services are valid for subsequent further processing.

The connection probe management module 110 further includes a short range sensing module 111 and a registration module 112 (for the sake of simplicity, they are not shown in the drawings). The short range sensing module 111 is the core component of the connection probe management module 110, and it cooperates with the registration module 112 to ensure that the connection probe management can operate normally. In short, the short range sensing module 111 is used to detect whether or not there are available service/connection access points or service/location tags within the short-to-medium range from the mobile device (this process is also called a discovery process), then the registration module 112 registers the detected result of the short range sensing module 111 into the list 160 of service/location tags selectable by the mobile device.

The short range sensing module 111 is used to detect if there are connections by communication protocol services existing in the mobile device within the short-to-medium range. The detectable range of the short range sensing module 111 may be different depending on different communication protocols adopted by the mobile device. This is why the specific discovery process is protocol dependent and platform dependent (and potentially hardware dependent). An example of detecting available service/location tags is the Bluetooth device discovery using Microsoft Windows CE 5.0 API WSALookupServiceBegin( ) and related function calls on Windows CE devices supporting Bluetooth (e.g., refer to http://msdn.microsoft.com/library/default.asp?url=/library/en-us/wcecomm5/html/wce50lrfWSALookupServiceBeginBluetooth.asp).

The service selection module 120 may connect to connection/service providers and retrieve service information from the connection/service providers. The service information can include cost, and service level/quality, etc. For example, the specific details about the services, i.e., service information can be retrieved from the service provider backends, the service access points or a memory of service tags. In addition, the service selection module 120 can filter and select services from the list 160 of the available service/location tags selectable by the mobile device by referring to rules and preference information predefined by the user of the mobile device and stored in the service directory 150, and decide whether or not the service subscription needs to be confirmed by the user. After that, the service selection module 120 can confirm whether the user is required to be authenticated or not, check the service directory for PIN (personal identification number), or prompt the user to input the PIN, and trigger the service triggering module 130 to start a series of corresponding actions in the mobile device.

The service triggering module 130 can reference to the service directory 150 so as to determine and control the actions needed to be triggered within the mobile device. In most cases, it relates to the service providers and other external location based services. For example, the service triggering module 130 can trigger the mobile device to connect to the service providers, issue commands to the service providers (e.g., a command of downloading music) and so on.

The service status management module 140 has a service status tracking and alerting function; that is, it can capture events in which a connection is found or lost, and can also track how long the user has used the services and how much he/she has spent on the services, and in some cases, it can provide visual/audio alerts to the user. For example, according to the rules set by the user, if the cost already spent by the user on a certain service has reached a certain limit, the service status management module will trigger an alert, and optionally disconnect the service.

In addition, in some cases, the service status management module can also provide the user of the mobile device with a usage summary and logging feature when necessary (the details and level of logging depend on the storage capacity of the mobile device).

For example, in one embodiment, according to the rules set by the user, the service status management module 140 can provide the user of the mobile device with a visual/audio alert when one of the following conditions occurs:

When the short range sensing module has detected a compatible and potentially better service;

When it is found that the service currently used is not reachable;

When an automatic service switchover is required because the service selection module has selected a service superior to the current service.

The service/rule repository 170 is used to store the rules and preference information of service subscriptions preset by the user of the mobile device. In an example, the service/rule repository 170 can be stored in, for example, a volatile memory of the mobile device.

The service directory 150 is used to store valid and qualified services. In an example, the service directory 150 can be stored in, for example, a non-volatile memory of the mobile device.

The list 160 of the service/location tags selectable by the mobile device is a list of available services from which the user of the mobile device can pick up and select one. In an example, it can be stored in, for instance, a non-volatile memory of the mobile device.

Furthermore, in order to clearly illustrate the interaction between the mobile device 100 according to the present invention and the external environment, the interaction between the respective modules of the mobile device 100 according to the present invention and a service provider/connection provider/location tag/service access point 2 is schematically shown by means of the dashed line in FIG. 1.

According to the present invention, the mobile device 100 can dynamically interact with a service provider/connection provider/location tag/service access point. The connection provider and service provider are used to provide necessary service details sufficient for the user or the mobile device to determine if the service should be subscribed. If the service/connection is not free, then the connection provider and service provider should have modules or means for the authentication and control of the service access. The service access point is the media which has the above-mentioned functions thereon. The location tag has a memory with a unique identifier which can be used by the mobile device to identify the location stored thereon.

Functions of each module in the mobile device have been briefly described in the above. The operations of the process executed by the modules and the functions thereof will be clearer and more apparent from the method of the present invention explained by referring to FIG. 2.

Figure 2:
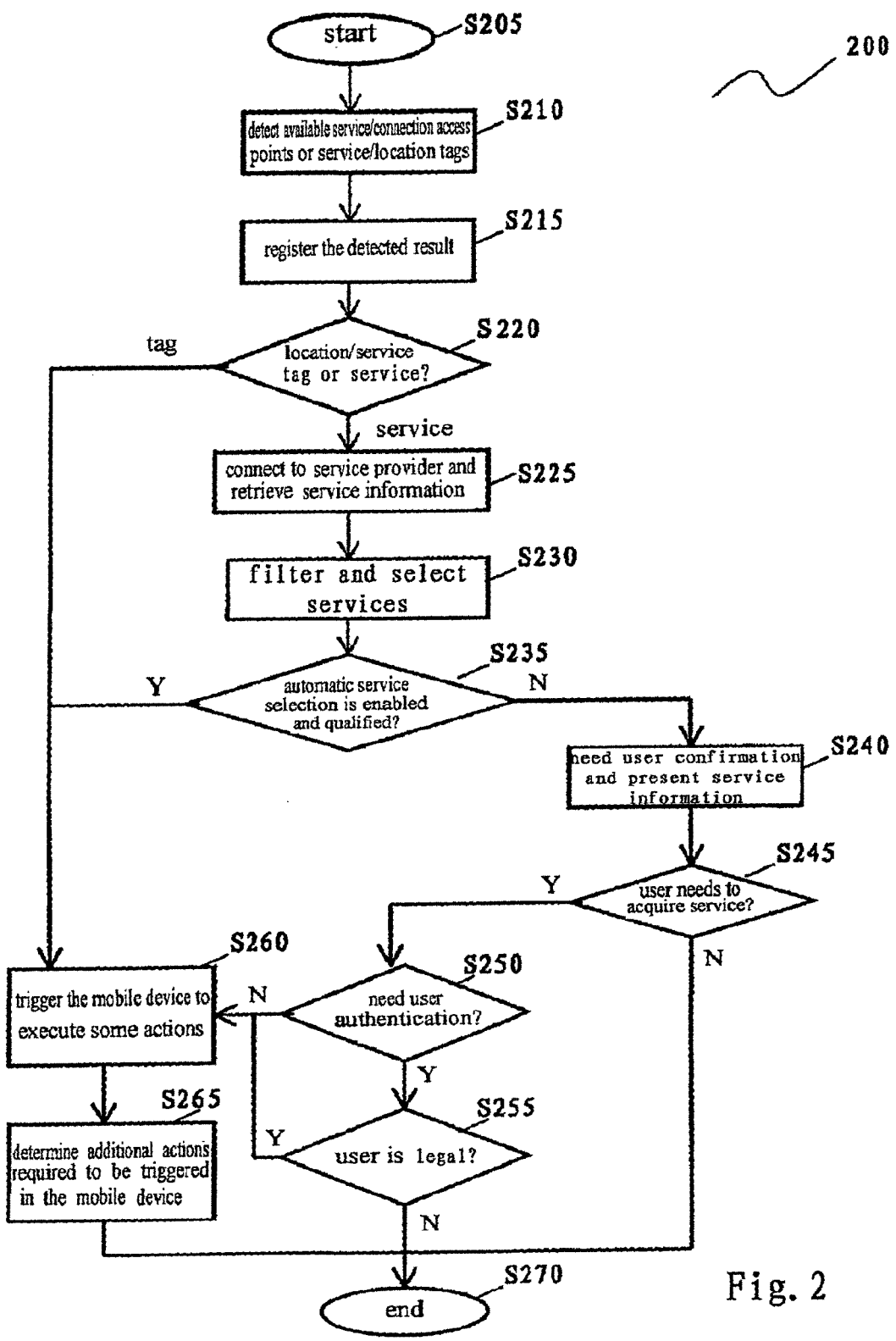
FIG. 2 shows a flow chart of a method for enabling the mobile device to select and subscribe services automatically according to an embodiment of the present invention.

FIG. 2 shows a flow chart of a method 200 for enabling the mobile device to automatically select and subscribe services according to an embodiment of the present invention.

As shown in FIG. 2, the method 200 begins with step S205. Then, in step S210, the short range sensing module 111 in the connection probe management module 110 detects whether or not there are available service/connection access points or service/location tags within the short-to-medium range from the mobile device (i.e., whether or not there are connections by communication protocol services existing in the mobile device 100) (this process is also called a discovery process).

Next, the method proceeds to step S215, in which the registration module 112 in the connection probe management module 110 registers the location/service tags detected by the short range sensing module 111 into the list of available service/location tags 160, i.e., updates the list of available service/location tags 160 in the mobile device, so that the mobile device can select them from the list.

After that, the method proceeds to step S220, where it is decided whether the newly detected one by the short range sensing module 111 is a location/service tag or a service.

If it is determined that the newly detected one by the short range module 111 is a location/service tag, then the method proceeds to step S260.

If it is determined that the newly detected one by the short range module 111 is a service, then the method proceeds to step S225.

In step S225, the service selection module 120 connects to the service provider according to the protocols (including wireless and wired connection protocols) and connection information registered in the mobile device, and retrieves service information, for example, including cost and service level/quality, etc., from the service provider.

After step S225, the method proceeds to step S230, where the service selection module 120 filters and selects the services based on the selection criteria and rules preset by the user which are stored in the service/rule repository 170 of the mobile device.

Figure 3:
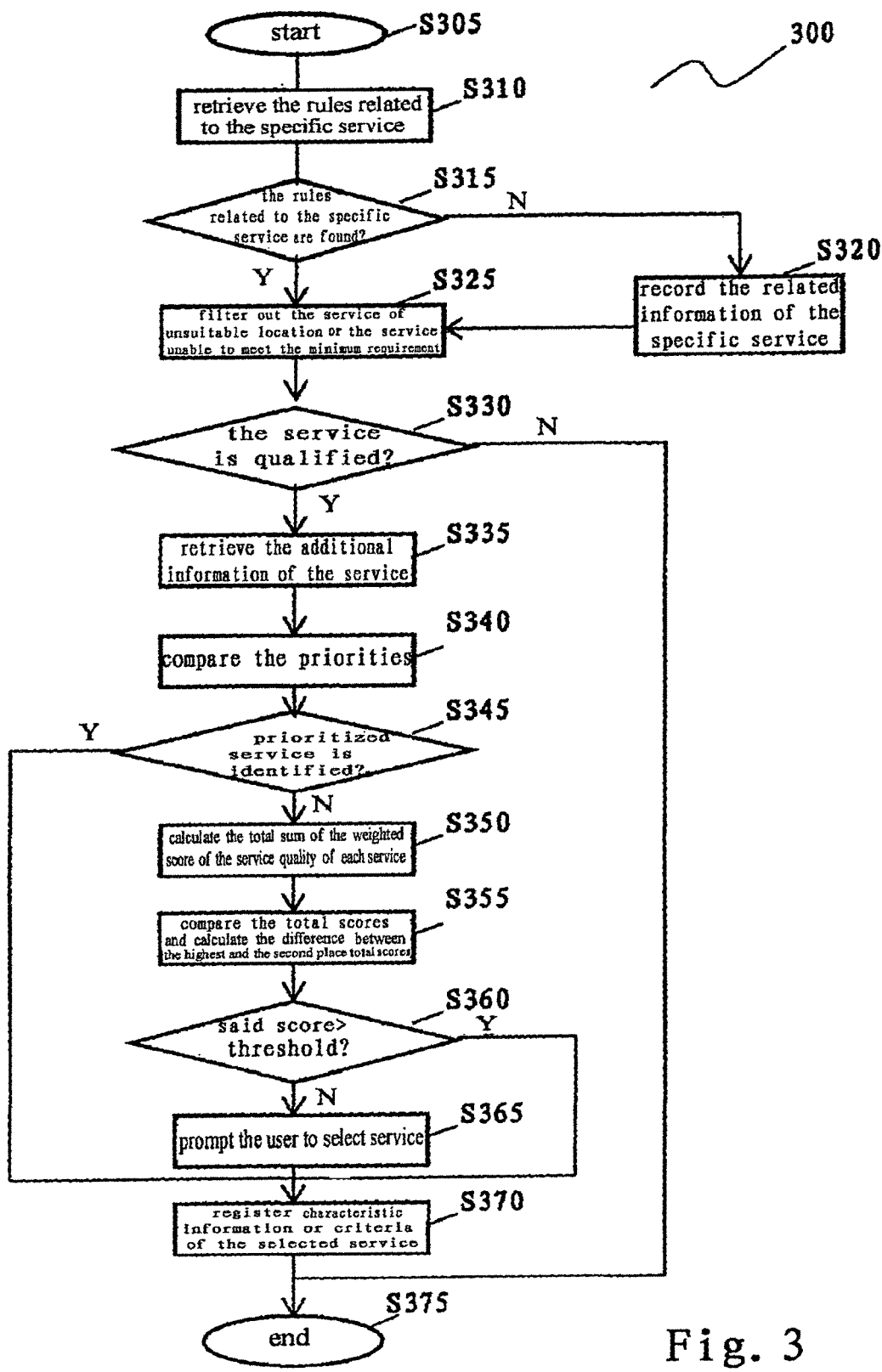
FIG. 3 shows a flow chart of a process of how a service selection module filtering and selecting services when a plurality of available services are detected concurrently according to one embodiment of the present invention.

The specific details about how the service selection module 120 filters and selects the services according to the user's settings when there exists a plurality of selectable services will be further described hereafter with reference to the flow chart of FIG. 3.

Next, in step S235, the service selection module 120 determines whether or not automatic service selection is enabled or qualified based on the selection criteria preset by the user and stored in the service/rule repository 170 (i.e., determines whether or not the automatic service selection is enabled, and whether or not the service is qualified or permitted).

If it is determined that the automatic service selection is enabled and qualified in step S235, then the method proceeds to step S260, else the method proceeds to step S240.

In step S240, the service selection module 120 determines that the service subscription requires user confirmation, and then presents the service information.

Then, the method proceeds to step S245, where the user decides whether or not it is desirable to acquire the service.

If the user decides to acquire the service in step S245, then the method proceeds to step S250. Otherwise the method proceeds to step S270 where the process of the method ends.

In step S250, the service selection module 120 confirms whether the user authentication is required or not. If it is confirmed that the user authentication is required in step S250, then in step S255, the service selection module 120 checks the PIN in the service directory (usually, PIN is encrypted), or prompts the user to input the PIN, so as to confirm whether or not the user is legal.

If the user is confirmed to be legal, that is, if the authentication is successful, then the method proceeds to step S260. Otherwise, the method proceeds to step S270 where the process of the method ends.

In step S260, the service triggering module 130 triggers the mobile device 100 to execute some actions, for example, connecting to the service provider, and/or issuing commands such as downloading music or ready for downloading, etc. to the service provider.

Next, in step S265, the service triggering module 130 determines additional actions, such as downloading or playing music, etc., needed to be triggered in the mobile device 100 by referring to the service directory 150.

Finally, in step S270, the process of this method ends.

It should be noted here that, for the purpose of simplicity and clarity, the process related to the service status management module 140 is not shown in FIG. 2.

In addition, it should be noted that, for the purpose of simplicity and clarity, a step of updating the contents stored in the service directory is not shown in the flow chart. The step of updating the service directory may be set to be executed in one of the plurality of method steps or to be executed thereafter depending on the platform used by the mobile device and the mobile device manufacturer, according to design requirements of developers. For example, the updating process of the service directory can be executed in one of the steps S210, S215, and S260, etc., or it can be executed thereafter. Of course, it is obvious for those skilled in the art that other setting manners are possible.

When the short range sensing module 111 detects that there exists available services/connections or that any service/connection is lost within the short-to-medium range, it may inform the service status management module 140, so that the service status management module 140 can track the discovery or loss of the service/connections.

In addition, when the service triggering module 130 triggers the mobile device to start receiving and enjoying the service or terminate the service, it may inform the service status management module 140, so that the service status management module 140 can track the beginning or termination of the service, and can acquire information such as, for example, how long the user of the mobile device has used the service, how much he/she has spent on the service, and so on.

For example, according to the rules preset by the users and stored in the service/rule repository 170, if the user has set that the cost spent on a certain service cannot be higher than a certain threshold, or the time of using a certain service cannot be longer than a predetermined time period, when the service status management module 140 tracks that the cost spent on the service has reached or exceeded said set threshold or that the time limit of the service usage has expired, it will trigger an alert such as beeping or continuously flashing a indicator light according to the user's settings. In the case where the user has set to automatically disconnect when the set criteria has been reached, the service status management module 140 may inform the service triggering module 130 to trigger the mobile device to disconnect from the service.

Of course, it is possible for those skilled in the art to set other rules or adapt other alerting modes. For example, it can be set that when the short range sensing module 111 has detected a new and possibly better service/connection, it triggers the alert so as to prompt the user to make the selection.

Now referring to the flow chart of FIG. 3, the details as to how the service selection module 120 filters and selects the services according to the user's settings when the short range sensing module 111 has detected a plurality of available service is further described.

FIG. 3 shows the flow chart of the process as to how the service selection module 120 in the mobile device 100 filters and selects the services when a plurality of available services selectable by the mobile device has been detected concurrently, according to one embodiment of the present invention.

In this embodiment, it is assumed that the service selection module 120 determines the service best matching to the user's settings from the plurality of available services for selection made by the user, by determining the priority of each service and then calculating the weighted score value of each service's attributes.

According to one embodiment of the present invention, the user may set the priority of each service in the form of a percentage for various attributes of the services according to the user's preference or the requirements. For example, it is assumed that the user's settings are as follows: cost/hour=90%, bandwidth=10%.

As shown in FIG. 3, the process begins with step S305.

In step S310, the short range sensing module retrieves rules related to a specific service from the service/rule repository 170.

In step S315, it is determined whether or not the rules related to the specific service are found.

If it is determined that the rules are not found in step 315, then the process proceeds to step 320 where the service selection module registers the relevant information related to the specific service into the service/rule repository 170.

After step S320, the process proceeds to step S325.

If it is determined that the rules related to the specific service have been found in the service/rule repository 170 in step 315, then the process proceeds to step S325, where the service selection module 120 filters out services which are not suitable for the location of the mobile device or services which cannot meet the minimum requirement according to the retrieved rules.

For example, in one embodiment, the user of the mobile device may set the flowing minimum requirement, signal quality>30%, or cost<40 USD/Hr. Of course, other forms of rules are also possible.

Next, in step S330, it is decided whether or not the specific service is qualified.

If it is determined that the specific service is not qualified in step S330, then the process proceeds to step S375 where the process is exited.

If the specific service is determined to be qualified in step S330, then the process proceeds to step S335.

In step S335, the service selection module 120 retrieves additional information of the specific service, such as signal strength, bandwidth, and used protocol, etc. from the service directory 150 or the service/connection provider 2.

Then, in step S340, the service selection module 120 compares the priority of the specific service (i.e., the priority of the service type to which the specific service belongs) with those of other services.

Herein, the priorities of various services can be preset by the user of the mobile device and stored in the service/rule repository 170. For example, in one embodiment, the user can preset that a service of the IEEE 802.11b protocol have superiority over those of other communication protocols regardless of the spent cost, which means that the priority of the service provided by the IEEE 802.11b protocol is higher than that of all other services among all services provided by various wireless or wired communication protocols.

Then, in step S345, the service selection module 120 determines whether or not the prioritized service has been identified.

If the prioritized service has been identified in step S345, then the process goes to step S370. Otherwise, the process goes to step S350.

In step S350, the service selection module 120 calculates the total of the weighted score value of the service quality of each service based on the attributes of each specific service and the rules (and/or parameters) retrieved from the service/rule repository 170.

For example, as described above, when setting "cost/hour=90%, bandwidth=10%", the percentage priorities are used to add the service quality of each service after being weighted, so that the total score value thereof can be calculated.

Next, in step S355, the total scores of all the services are compared with each other, and the difference between the highest and the second place total scores is calculated.

Then in step S360, it is decided whether or not the difference between the highest and the second place total scores is larger than a predetermined threshold.

If it is determined that the difference between the highest and the second place total scores is larger than the predetermined threshold, then the process goes to step S370. Otherwise, the process goes to step S365.

In step S365, the user is prompted to select one of the services.

In step S370, the relevant characteristic information or criteria of the service selected by the user is registered into the list of available service/location tags 160 based on the selection made by the user in step S365.

Then in step S375, this process is exited.

It is necessary to be explained that, in the example as shown in FIG. 3, only one particular implementation on how to filter and select the services by the service selection module 170 is shown. For those skilled in the art, other implementations are also possible, and the service selection module 120 can employ any of the existing methods for filtering or selecting the services based on the rules or criteria preset by the user.

In addition, it is necessary to be explained that the user of the mobile device can define or input corresponding rules/preference information based on requirements or the user's preference. These rules/preference information are helpful for the mobile device or the user to quickly pick up a prioritized service from the list of available services, automatically connect to the service, or trigger a specific service in the mobile device. Some frequently used criteria can comprise cost, reliability, quality and capacity, etc. These criteria can be presented as thresholds or weighted values, or the combination thereof as the defined rules, and they may include logic operators, for example, rule dependency, AND/OR, and NOR, etc. For example, the user may define some forms of rules to exclude those services which are considered to be unacceptable and ignore them.

Some mobile devices have a small screen or limited processing power, which makes it not a good front-end for defining the above rules. Therefore, an input module can be provided to input the rules defined by means of other front-ends (such as a web application or PC based software).

If the screen size and processing power of the mobile device permit, then a simple rule maintenance module can be implemented thereon. Those newly defined/modified rules can be exported to a storage repository external to the mobile device for further operations or reuse. In addition, the mobile device manufacturers can choose to implement Internet based services to allow the mobile device to edit, store and download the rules, and can allow the device owner to download sample rules to simplify the subsequent process.

Besides allowing the user to register a set of rules for selecting services and prioritizing the services, the rule maintenance module should allow the user to define a sequence of actions which can be triggered by the mobile device (e.g., services residing inside the mobile device, services provided by the service provider, services provided by an external device which can be controlled directly or indirectly by the mobile device); then these actions can be bound to a specific location tag or service tag, so that the user of the mobile device can define the setting of the actions he/she wishes to perform when the device detects the presence and absence of a certain location or service.

Besides the simple action setting, the user can also set to perform actions according to some simple conditions (and, if feasible, even according to the rules). For example, a simple example is as follows: when a home location tag is found, then the calls of a mobile phone will be automatically forwarded; or if a call message is found, then a message recording system alert will be played.

Moreover, in the present invention, the mobile device may be a portable device, such as for example, cellular phone, PDA (personal digital assistant), notebook and so on, and may also be one of other devices with a wireless or wired communication function; the non-volatile memory may be a Read Only Memory (ROM), Programmable Read-Only Memory (PROM), Erasable Programmable Read Only Memory (EPROM), Electrically Erasable Programmable Read Only Memory (EEPROM), flash ROM and the like. The service/connection access point in the present invention can be any of the following devices including, for example, a desk phone, Wireless Access Point, desktop computer and so on.

Finally, it is necessary to be explained that, although the present invention is described by an example of wireless communication, it is obvious for those skilled in the art that the principles of the present invention can also be applied to the wired communication field.

Furthermore, it should be noted that the embodiments described above are only used to illustrate the present invention, in which some specific details thereof are given only for the purpose of understanding and are not intended to make limitations to the present invention.

It can be seen from the above description of the specific embodiments of the present invention that, by utilizing the present invention, mobile devices supporting a plurality of connection protocols can dynamically interact with the external environment to select and subscribe service automatically, so that users of the mobile devices can enjoy faster, more satisfied, or more economic services based on their location, thereby providing the users with higher usage satisfaction.

With the present invention, service access cost can be reduced and/or access speed can be improved by providing automatic service selection/roaming, thereby improving the usability of the mobile device, and network coverage of the mobile device is increased through the service/connection switching.

With the present invention, loads of the most costly infrastructure can be potentially reduced and the problem of imbalance of the network loads can be solved by the cost based selection.

In addition, with the present invention, the mobile device or connection/service provider can be triggered to automatically perform some actions, for example, synchronization or home device control and so on, so that information update/synchronization can be improved.

Further, according to the present invention, the service provider is provided with a new way to establish contacts with users in a seamless manner.

In addition, it is obvious that each of the operation steps of the above mentioned method can also be implemented in a computer executable program which is stored in various machine readable storage media.

In addition, the objects of the present invention can be achieved by providing directly or indirectly to a system or device storage media having codes of the above executable program stored thereon, then reading out the program codes and performing the same by a computer or CPU of the system or device.

Herein, so long as the system or device has the function of the program, the program can be executed in the form of, for example, object program, program performed by an interpreter, or script data provided to an operating system, etc.

The machine readable storage medium mentioned above may include but not be limited to various memory and storage units, semiconductor device, magnetic disk units, such as optical, magnetic and magneto-optic disks, and other media suitable for storing information.

In addition, the present invention may be achieved by a client computer by connecting to corresponding websites on the Internet, downloading the computer program codes of the present invention and installing the same into the computer and then executing the program.

Although the embodiments of the present invention have been described in detail with reference to the appended drawings, various modifications and changes can be made by those skilled in the art without departing from the spirit and scope of the present invention. Therefore, the scope of the present invention is only defined by the appended claims and the equivalents thereof.

What is claimed is:

1. A method for enabling a mobile device to acquire a service, comprising:
    detecting an availability within a medium range from the mobile device of a service connection access point;
    connecting to a service provider of the available service connection access point and retrieving service information with regard to a plurality of selectable services available from the service provider;
    filtering out a non-suitable service of the plurality of selectable services which is not suitable as a function of determining that an attribute of the non-suitable service cannot meet a minimum requirement according to a preset user selection rule stored in the mobile device;
    calculating a weighted score value of at least one attribute of each of the filtered plurality of selectable services available from the service provider as a function of the preset user selection rule;
    selecting a service from the filtered plurality of selectable services of the service provider having a service information attribute with a calculated weighted score value better than a calculated weighted score value of an attribute of a service currently in use by the mobile device as a function of the preset user selection rule stored in the mobile device;
    determining whether or not an automatic selection of the selected service is enabled and qualified as a function of the preset user selection rule;
    requiring user confirmation for subscribing to the selected service if it is determined that the automatic service selection is enabled but not qualified; and
    switching over from the service currently in use and using the selected service if a user confirms using the service or if it is determined that the automatic service selection is enabled and qualified.

2. The method of claim 1, further comprising:
    tracking the using of the selected service; and
    if the tracked using of the selected service exceeds a threshold amount of the preset user selection rule, as a function of a preset user selection rule, alerting a user of the mobile device or automatically terminating the using of the selected service by the mobile device.

3. The method of claim 1, wherein the at least one attribute is at least one of a signal quality attribute, a bandwidth attribute and a cost attribute.

4. The method of claim 1, wherein the requiring user confirmation for subscribing to the selected service comprises alerting the user of the availability of the service best matching the preset user selection rule as the function of the weighted score values and prompting the user to select the service best matching.

5. The method of claim 1, further comprising:
    determining a location of a mobile device by detecting a location tag within the medium range from the mobile device; and
    wherein the non-suitable service is filtered out as a function of determining that the non-suitable service is not suitable for the determined location of the mobile device.

6. The method of claim 4 further comprising:
    updating a list of selectable service providers in the mobile device by registering the service information of the service provider of the detected available service connection access point into the list; and
    wherein the selecting the service best matching the preset user selection rule of the filtered plurality and the current service as a function of the weighted score values comprises selecting a service of the list that best matches the preset user selection rule as the function of the weighted score values.

7. An apparatus, comprising:
    a mobile device that detects an availability within a medium range from the mobile device of a service connection access point to connect to a service provider of the available service connection access point and retrieve service information with regard to a plurality of selectable services available from the service provider;
    the mobile device to further:
        filter out a non-suitable service of the plurality of selectable services which is not suitable as a function of determining that an attribute of the non-suitable service cannot meet a minimum requirement according to a preset user selection rule stored in the mobile device;
        calculate a weighted score value of at least one attribute of each of the filtered plurality of selectable services available from the service provider as a function of the preset user selection rule;
        select a service from the filtered plurality of selectable services of the service provider having a service information attribute with a calculated weighted score value better than a calculated weighted score value of an attribute of a service currently in use by the mobile device as a function of the preset user selection rule stored in the mobile device;
        determine whether or not an automatic selection of the selected service is enabled and qualified as a function of the preset user selection rule;
        require confirmation by a user of the mobile device for subscribing to the selected service if it is determined that the automatic service selection is enabled but not qualified; and
        switch over from the service currently in use and use the selected service if the user confirms using the service or if it is determined that the automatic service selection is enabled and qualified.

8. The apparatus of claim 7, wherein the mobile device is further to:
    track the use of the selected service; and
    if the tracked use exceeds a threshold amount of the preset user selection rule, as a function of a preset user selection rule, alert a user of the mobile device or automatically terminate the use of the selected service by the mobile device.

9. The apparatus of claim 7, wherein the at least one attribute is at least one of a signal quality attribute, a bandwidth attribute and a cost attribute.

10. The apparatus of claim 7, wherein
    the mobile device requires the user confirmation for subscribing to the selected service by alerting the user of the availability of the service best matching the preset user selection rule as the function of the weighted score values and prompting the user to select the service best matching.

11. The apparatus of claim 7, wherein the mobile device is to further determine a location of a mobile device; and
    wherein the non-suitable service is filtered out as a function of determining that the non-suitable service is not suitable for the determined location of the mobile device.

12. The apparatus of claim 10, wherein the mobile device further:
    updates a list of selectable service providers in the mobile device by registering the service information of the service provider of the detected available service connection access point into the list; and selects the service best matching the preset user selection rule of the filtered plurality and the current service as the function of the weighted score by selecting a service of the list that best matches the preset user selection rule as the function of the weighted score values.

13. A computer program product for enabling a mobile device to acquire a service, the computer program product comprising:

a non-transitory computer readable storage medium having computer readable program code embodied therewith, the computer readable program code comprising:

computer readable program code configured to, when executed on a programmable mobile device, cause the mobile device to:

detect an availability within a medium range from the mobile device of a service connection access point to connect to a service provider of the available service connection access point and retrieve service information with regard to a plurality of selectable services available from the service provider;

filter out a non-suitable service of the plurality of selectable services which is not suitable as a function of determining that an attribute of the non-suitable service cannot meet a minimum requirement according to a preset user selection rule stored in the mobile device;

calculate a weighted score value of at least one attribute of each of the filtered plurality of selectable services available from the service provider as a function of the preset user selection rule;

select a service from the filtered plurality of selectable services of the service provider having a service information attribute with a calculated weighted score value better than a calculated weighted score value of an attribute of a service currently in use by the mobile device as a function of the preset user selection rule stored in the mobile device;

determine whether or not an automatic selection of the selected service is enabled and qualified as a function of the preset user selection rule;

require confirmation by a user of the mobile device for subscribing to the selected service if it is determined that the automatic service selection is enabled but not qualified; and switch over from the service currently in use and use the selected service if the user confirms using the service or if it is determined that the automatic service selection is enabled and qualified.

14. The computer program product of claim 13, the computer readable program code further configured to cause the mobile device to:

track the use of the selected service; and if the tracked use of the selected service exceeds a threshold amount of the preset user selection rule, as a function of a preset user selection rule, alert a user of the mobile device or automatically terminate the use of the selected service by the mobile device.

15. The computer program product of claim 13, the computer readable program code further configured to cause the mobile device to require the user confirmation for subscribing to the selected service by alerting the user of the availability of the service best matching the preset user selection rule as the function of the weighted score values and prompting the user to select the service best matching.

16. The computer program product of claim 13, the computer readable program code further configured to cause the mobile device to determine a location of a mobile device; and filter out the non-suitable service as a function of determining that the non-suitable service is not suitable for the determined location of the mobile device.

17. The computer program product of claim 13, the computer readable program code further configured to cause the mobile device to:

update a list of selectable service providers in the mobile device by registering the service information of the service provider of the detected available service connection access point into the list; and select the service best matching the preset user selection rule of the filtered plurality and the current service as the function of the weighted score by selecting a service of the list that best matches the preset user selection rule as the function of the weighted score values.

\* \* \* \* \*